United States Patent
Lee et al.

(10) Patent No.: US 10,395,112 B2
(45) Date of Patent: Aug. 27, 2019

(54) DEVICE AND METHOD OF RECOGNIZING IRIS

(71) Applicant: SAMSUNG ELECTRONICS CO., LTD., Suwon-si (KR)

(72) Inventors: Hyunjeong Lee, Hwaseong-si (KR); Jihye Kim, Anyang-si (KR); Sungjoo Suh, Seoul (KR); Chang Kyu Choi, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/672,450

(22) Filed: Aug. 9, 2017

(65) Prior Publication Data
US 2018/0218213 A1 Aug. 2, 2018

(30) Foreign Application Priority Data
Feb. 2, 2017 (KR) .................. 10-2017-0015020

(51) Int. Cl.
G06K 9/00 (2006.01)
G06K 9/46 (2006.01)
G06K 9/38 (2006.01)

(52) U.S. Cl.
CPC ....... *G06K 9/00617* (2013.01); *G06K 9/0061* (2013.01); *G06K 9/00604* (2013.01); *G06K 9/38* (2013.01); *G06K 9/4609* (2013.01); *G06K 9/00228* (2013.01); *G06K 9/00275* (2013.01); *G06K 9/00281* (2013.01)

(58) Field of Classification Search
CPC .................. G06K 9/00604; G06K 9/4609
See application file for complete search history.

(56) References Cited

U.S. PATENT DOCUMENTS

| | | | |
|---|---|---|---|
| 5,291,560 A | 3/1994 | Daugman | |
| 2009/0220126 A1* | 9/2009 | Claret-Tournier | G06K 9/0061 382/117 |
| 2010/0074477 A1* | 3/2010 | Fujii | G06K 9/00604 382/117 |
| 2011/0274319 A1* | 11/2011 | Su | A61B 5/117 382/117 |
| 2011/0280454 A1* | 11/2011 | Su | G06K 9/0061 382/117 |
| 2014/0037152 A1* | 2/2014 | Tan | G06K 9/00597 382/117 |

(Continued)

FOREIGN PATENT DOCUMENTS

| | | |
|---|---|---|
| JP | 3966309 B2 | 8/2007 |
| JP | 5387007 B2 | 1/2014 |

(Continued)

OTHER PUBLICATIONS

Sun-Ah Song, et al. "A Fast Iris Region Finding Algorithm for Iris Recognition", 2003, pp. 876-884.

(Continued)

*Primary Examiner* — Edward Park
(74) *Attorney, Agent, or Firm* — NSIP Law

(57) ABSTRACT

A device and method of recognizing an iris is provided. An iris recognition device may determine a threshold brightness using a histogram of a reference area from an iris image and exclude a target pixel from iris recognition in a candidate area based on the determined threshold brightness.

24 Claims, 11 Drawing Sheets

(56) References Cited

U.S. PATENT DOCUMENTS

| 2015/0269419 | A1* | 9/2015 | Bae | G06K 9/00604 |
| | | | | 382/117 |
| 2017/0228594 | A1* | 8/2017 | Takemoto | G06K 9/0061 |
| 2018/0218213 | A1* | 8/2018 | Lee | G06K 9/00617 |

FOREIGN PATENT DOCUMENTS

| KR | 10-2003-0066512 A | 8/2003 |
| KR | 10-1030613 B1 | 4/2011 |
| KR | 10-1101142 B1 | 1/2012 |
| KR | 10-1202448 B1 | 11/2012 |
| WO | WO 94/09446 | 4/1994 |
| WO | WO 2010/011785 A1 | 1/2010 |
| WO | WO 2011/090225 A1 | 7/2011 |

OTHER PUBLICATIONS

Daugman, John. "How Iris Recognition Works." IEEE Transactions on circuits and systems for video technology 14.1; 2004 pp. 21-30.
Hong, Sung-Min, et al. "A Fast Iris Identification System for Mobile Device." Proceedings of the Korean Information Science Society Conference. Korean Institute of Information Scientists and Engineers.
Eun, In Ki, "A Method of Feature Extraction Based on Segmented Regions for Iris Recognition", Department of Computer Science Korea National Open University Graduate School, 2007 pp. 50, 51, 1-49.
Jeong, Dae-Sik, and Kang-Ryoung Park. "A Study on Iris Recognition by Iris Feature Extraction from Polar Coordinate Circular Iris Region." Journal of the Institute of Electronics Engineers of Korea SP 44.3; 2007 pp. 48-60.
He, Zhaofeng, et al. "Robust Eyelid, Eyelash and Shadow Localization for Iris Recognition." Image Processing, 2008. ICIP 2008. 15th IEEE International Conference on. IEEE, 2008, pp. 265-268.

* cited by examiner

DEVICE AND METHOD OF RECOGNIZING IRIS

CROSS-REFERENCE TO RELATED APPLICATION(S)

This application claims the benefit under 35 USC § 119(a) of Korean Patent Application No. 10-2017-0015020 filed on Feb. 2, 2017, in the Korean Intellectual Property Office, the entire disclosure of which is incorporated herein by reference for all purposes.

BACKGROUND

1. Field

The following description relates to an iris recognition technology.

2. Description of Related Art

A technology for verifying a user's identity using a biometric feature of the user has recently received interest. Biometric authentication technology, for example, face recognition, fingerprint recognition, vein pattern recognition, and iris recognition, may be used to verify an identity of a user based on a biometric feature that is unique for each person. Face recognition and fingerprint recognition are currently widely used, and recently, iris recognition has been researched.

Iris recognition is a noncontact recognition method that can be used in a biometric authentication technology. Iris recognition may recognize a user by analyzing a pattern of an iris of the user's eye. Each person has different iris patterns in the person's left eye and right eye, and even identical twins sharing an identical gene structure have different iris patterns. Iris recognition technology may extract an iris area in which a pupil area and a sclera area are differentiated in an image and may extract a feature from the extracted iris area.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of recognizing an iris includes obtaining an iris image, extracting a reference area from the iris image, determining a threshold brightness based on a plurality of pixels included in the reference area, and determining a target pixel to be excluded from iris recognition in the iris image based on the threshold brightness.

The extracting of the reference area may include dividing the iris image into a plurality of areas, and extracting one of the areas as the reference area.

The extracting of the reference area may include normalizing the iris image, and extracting the reference area from the normalized iris image.

The extracting of the reference area may include extracting, as the reference area, an area in which a target is absent among two areas divided based on a first axis that crosses a pupil area of the iris image.

The extracting of the area in which the target is absent as the reference area may include determining an axis that horizontally passes through a center point of the pupil area as a first axis.

The obtaining of the iris image may include obtaining the iris image normalized by converting an input image including an iris area, and the extracting of the reference area may include dividing the iris image into two areas based on a second axis that does not pass through a target in the iris image, and extracting, as the reference area, an area in which the target is absent among the two areas.

The determining of the threshold brightness may include generating a histogram associated with the pixels included in the reference area, and determining the threshold brightness based on the histogram.

The determining of the threshold brightness may include determining, as the threshold brightness, a value obtained by subtracting a weighted standard deviation of a brightness value of each of the pixels from a mean value of the brightness value of each of the pixels included in the reference area.

The obtaining of the iris image may include equalizing an intensity-based histogram of the iris image.

The determining of the target pixel based on the threshold brightness may include determining an area excluding the reference area from the iris image as a candidate area, and determining and excluding the target pixel from the candidate area.

The method may further include extracting an iris feature from the iris image from which the target pixel is excluded, and recognizing a user based on the extracted iris feature.

In another general aspect, an iris recognition device includes an image obtainer configured to obtain an iris image, and a processor configured to extract a reference area from the iris image, determine a threshold brightness based on a plurality of pixels included in the reference area, and determine a target pixel to be excluded from iris recognition in the iris image based on the threshold brightness.

The processor may be configured to divide the iris image into a plurality of areas and extract one of the areas as the reference area.

The processor may be configured to normalize the iris image and extract the reference area from the normalized iris image.

The processor may be configured to extract, as the reference area, an area in which a target is absent among two areas divided based on a first axis that crosses a pupil area of the iris image.

The processor may be configured to obtain the iris image normalized by converting an input image including an iris area, divide the iris image into two areas based on a second axis that does not pass through a target in the iris image, and extract, as the reference area, an area in which the target is absent among the two areas.

The processor may be configured to generate a histogram associated with the pixels included in the reference area and determine the threshold brightness based on the histogram.

The processor may be configured to determine, as the threshold brightness, a value obtained by subtracting a weighted standard deviation of a brightness value of each of the pixels from a mean value of the brightness value of each of the pixels included in the reference area.

The processor may be configured to determine an area excluding the reference area from the iris image as a candidate area, and determine and exclude the target pixel from the candidate area.

Other features and aspects will be apparent from the following detailed description, the drawings, and the claims.

Figure 1:
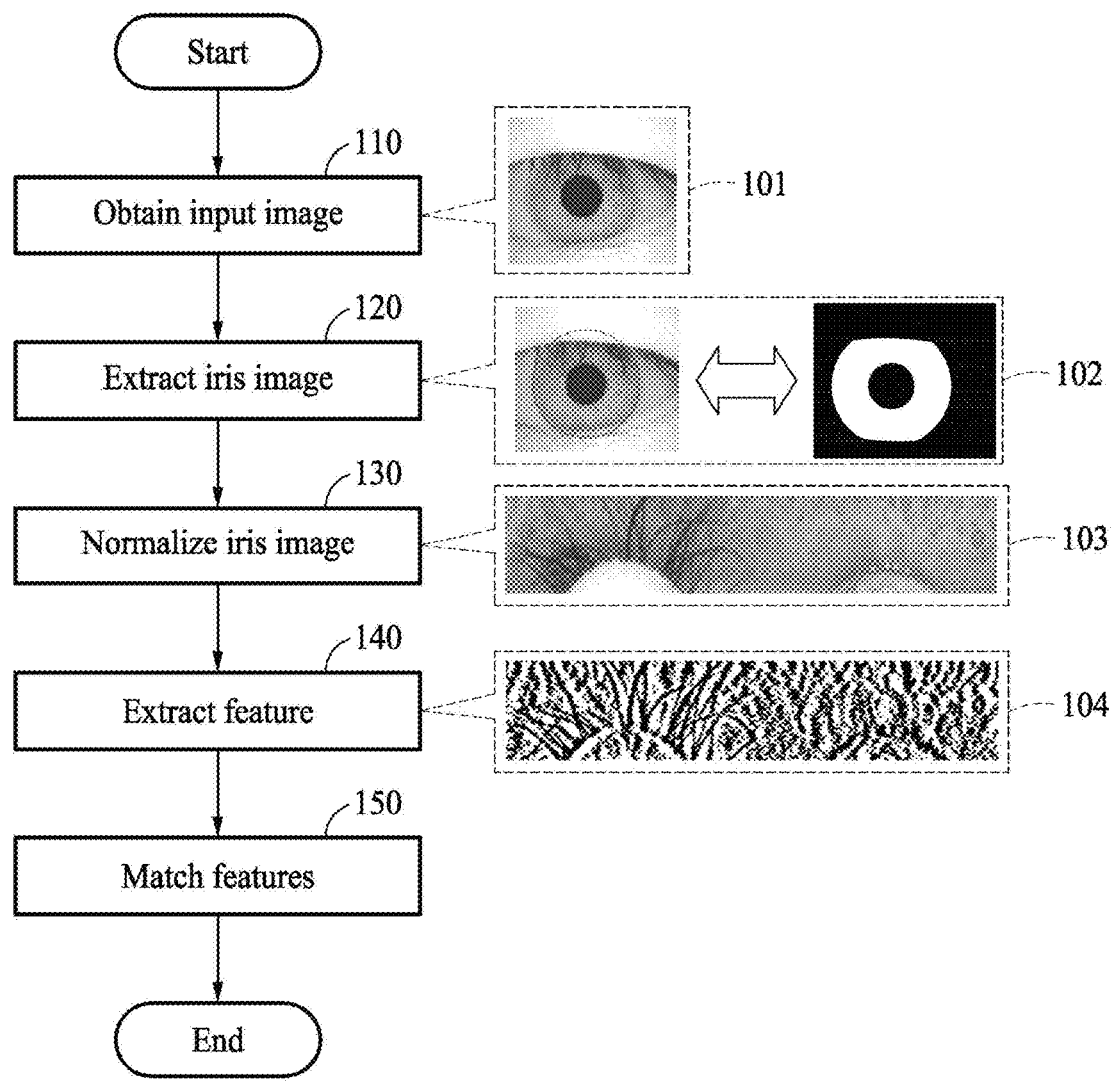
FIG. 1 is a flowchart illustrating a method of recognizing an iris according to an exemplary embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

As used herein, the terms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms including technical and scientific terms used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, reference will now be made in detail to examples with reference to the accompanying drawings, wherein like reference numerals refer to like elements throughout.

FIG. 1 is a flowchart illustrating a method of recognizing an iris according to an exemplary embodiment.

In operation 110, an iris recognition device obtains an input image 101. The input image 101 may be obtained by an iris sensor included in the iris recognition device, but may be obtained by other means such as previously obtained images. As only an example, the input image 101 contains an iris and a pupil.

In operation 120, the iris recognition device extracts an iris image 102. That is, the iris recognition device may generate the iris image 102 by extracting an iris area from the input image 101. The iris area may correspond to the iris in the input image 101 and may be an area that excludes, for example, a pupil, the white of an eye, an eyelid, and other non-iris parts of the input image 101. As shown in FIG. 1, the iris recognition device may generate an iris mask image corresponding to the iris area and may use the iris mask image with the iris image 102.

The iris recognition device may calculate information on, for example, center positions of the pupil and the iris, radiuses of the pupil and the iris, and curves of eyelids in response to an input image in which the iris is captured being input. For example, the iris recognition device may identify pixels included in the iris area corresponding to the iris in the input image and calculate the calculated information based on the identified pixels.

In operation 130, the iris recognition device normalizes the iris image 102. For example, the iris recognition device normalizes the iris image 102 by converting the iris image in a circular shape to a normalized image 103 in a rectangular shape.

In accordance with an exemplary embodiment, the normalizing may refer to an operation of converting the iris image 102 to an image having a predetermined standard, for example, a size, a shape, and/or a resolution. Thus, as illustrated in FIG. 1, the normalized iris image 103 may indicate an image in which the iris area is spread in the rectangular shape. For example, the normalizing of the iris area indicates an operation of converting a Cartesian coordinate system defined based on an x-axis and a y-axis of the iris image 102 to a polar coordinate system based on centers of circles of the iris and the pupil. For example, the Cartesian coordinate system is an orthogonal coordinate system defined based on an x-axis and a y-axis that are orthogonal to each other, and the polar coordinate system is defined based on an angle component θ and a radius component R. The iris recognition device may convert the iris area in a doughnut shape to an iris area in a long rectangular shape by normalizing the iris area. However, this is merely an example of normalization, and other normalization techniques may be uses in conjunction with or exclusively of the normalization technique described above.

The normalized iris image 103 illustrated in FIG. 1 may include an exclusion area (for example, left portion of the iris image 103 of FIG. 1) corresponding to an upper eyelid and an exclusion area (right portion of the iris image 103 of FIG. 1) corresponding to a lower eyelid. The exclusion areas corresponding to each eyelid may be associated with mask information when iris features are matched. The iris recognition device may exclude the exclusion areas from a matching score calculation.

In operation 140, the iris recognition device extracts a feature 104. The iris recognition device may extract the feature 104 for iris recognition from the normalized iris image 103. The feature 104 may correspond to unique information indicating an individual user's unique iris. As only an example, the iris recognition device may generate a code, hereinafter, referred to as an iris code, indicating information about a shape of a pattern and a position of the pattern represented in an iris image by applying a two-dimensional (2D) Gabor wavelet filter to the normalized iris image.

In operation 150, the iris recognition device matches features. The iris recognition device may match a feature, for example, an input iris code, extracted from the iris image 102 to a registered feature, for example, a registered iris code, corresponding to a registered iris. The iris recognition device may calculate a degree of similarity, hereinafter referred to as a similarity, between the registered iris code and the input iris code. The iris recognition device may verify whether a person is an identical person or another person based on the similarity between the registered iris code and the input iris code. As only an example, the iris recognition device calculates, as the similarity, a Hamming distance with respect to two iris codes, for example, an iris code corresponding to an input iris code and an iris code corresponding to a registered iris code. In response to a value of the Hamming distance being within a preset threshold distance range of similarity for recognition, the iris recognition device may verify that the input iris code and the registered iris code correspond a same person. In response to the value of the Hamming distance being out of the preset threshold distance range, the iris recognition device may verify that the input iris code and the registered iris code indicate different persons. The similarity may indicate a degree to which two iris codes match.

In a case where the input iris code and the registered iris code indicate different persons, the iris recognition device may enter a mode of registering a new user to the device using the input iris code, and may use the input iris code as a registered iris code in future recognition actions.

According to exemplary embodiments, the iris recognition device may enhance an accuracy in iris recognition even when an irregularly obtained eyelash area in the iris image is detected with a relatively small amount of calculation. The iris recognition device may classify an area in which an eyelash occlusion is severe as a candidate area and an area in which the eyelash occlusion is less severe as a reference area. The iris recognition device may determine a threshold brightness based on a histogram of a reference area. The threshold brightness may indicate a brightness set for differentiating a pixel corresponding to an iris from a pixel not corresponding to the iris. For example, a pixel having a brightness less than the threshold brightness is a pixel corresponding to an eyelash other than an iris, and a pixel having the brightness greater than or equal to the threshold brightness is a pixel corresponding to the iris.

Figure 2:
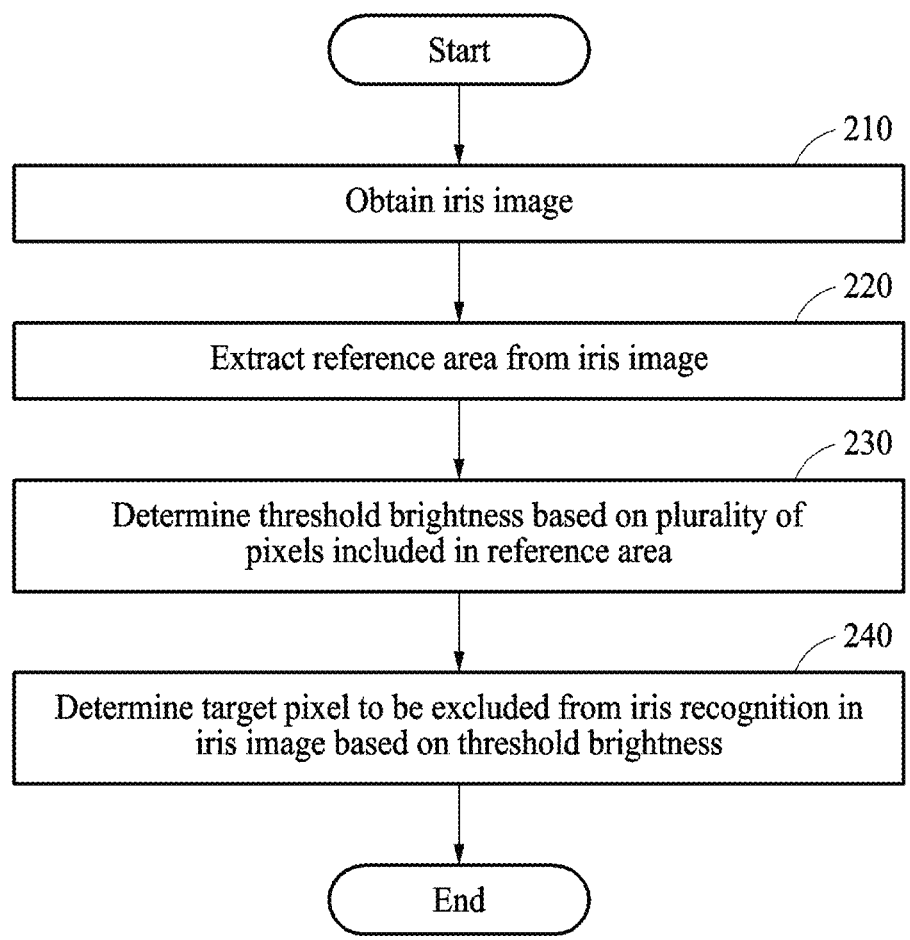
FIG. 2 is a flowchart illustrating a method of recognizing an iris according to an exemplary embodiment.

FIG. 2 is a flowchart illustrating a method of recognizing an iris according to an exemplary embodiment.

In operation 210, an iris recognition device obtains an iris image. For example, the iris recognition device obtains an input image including a pupil of a user as an iris image. The iris recognition device may extract an iris area from the input image including the pupil of the user. The iris recognition device may obtain the iris image by converting the iris area in a circular shape to an iris area in a rectangular shape, as shown in FIG. 1.

In operation 220, the iris recognition device extracts a reference area from the iris image. In an example, the iris recognition device divides the iris image into a plurality of areas and extracts one of the areas as the reference area. For example, the iris recognition device may divide the iris image into the reference area and a candidate area, and may extract the reference area only. In addition, the iris recognition device may normalize the iris image in a manner similar to that described above with reference to FIG. 1 and extract the reference area from the normalized iris image.

The candidate area may be an area of the image in which a target, for example, an eyelash, is present. For example, the candidate area may include a greater number of dark pixels corresponding to the eyelash than the reference area. The reference area may indicate an area in which a target, for example, an eyelash, is absent or a fewer number of targets are present. That is, the reference area may have less noise corresponding to the eyelash and also may have a greater area corresponding to a feature, for example, an intensity distribution corresponding to an iris, of an intensity value corresponding to the iris, as compared to the candidate area.

In operation 230, the iris recognition device determines a threshold brightness based on a plurality of pixels included in the reference area. For example, the iris recognition device may generate a histogram associated with the pixels included in the reference area. The iris recognition device determines the threshold brightness based on the histogram. The threshold brightness may indicate a reference brightness for classifying a target pixel. The target pixel may indicate a pixel corresponding to a target, for example, an eyelash.

In operation 240, the iris recognition device determines the target pixel to be excluded from iris recognition in the iris image based on the threshold brightness. For example, the iris recognition device may determine an area from which the reference area is excluded from the iris image as the candidate area. The iris recognition device may determine the target pixel from the candidate area and may exclude the target pixel from the iris recognition. However, this is only an example. The iris recognition device may determine the target pixel from an entire area including the candidate area and the reference area in the iris image.

The iris recognition device may extract an iris feature from the iris image from which the target pixel is excluded. The iris recognition device may recognize a user based on the extracted iris feature. For example, the iris recognition device may match the iris feature to a registered feature, and may identify the user corresponding to the registered feature of which a matching degree exceeds a threshold matching degree.

Figure 3:
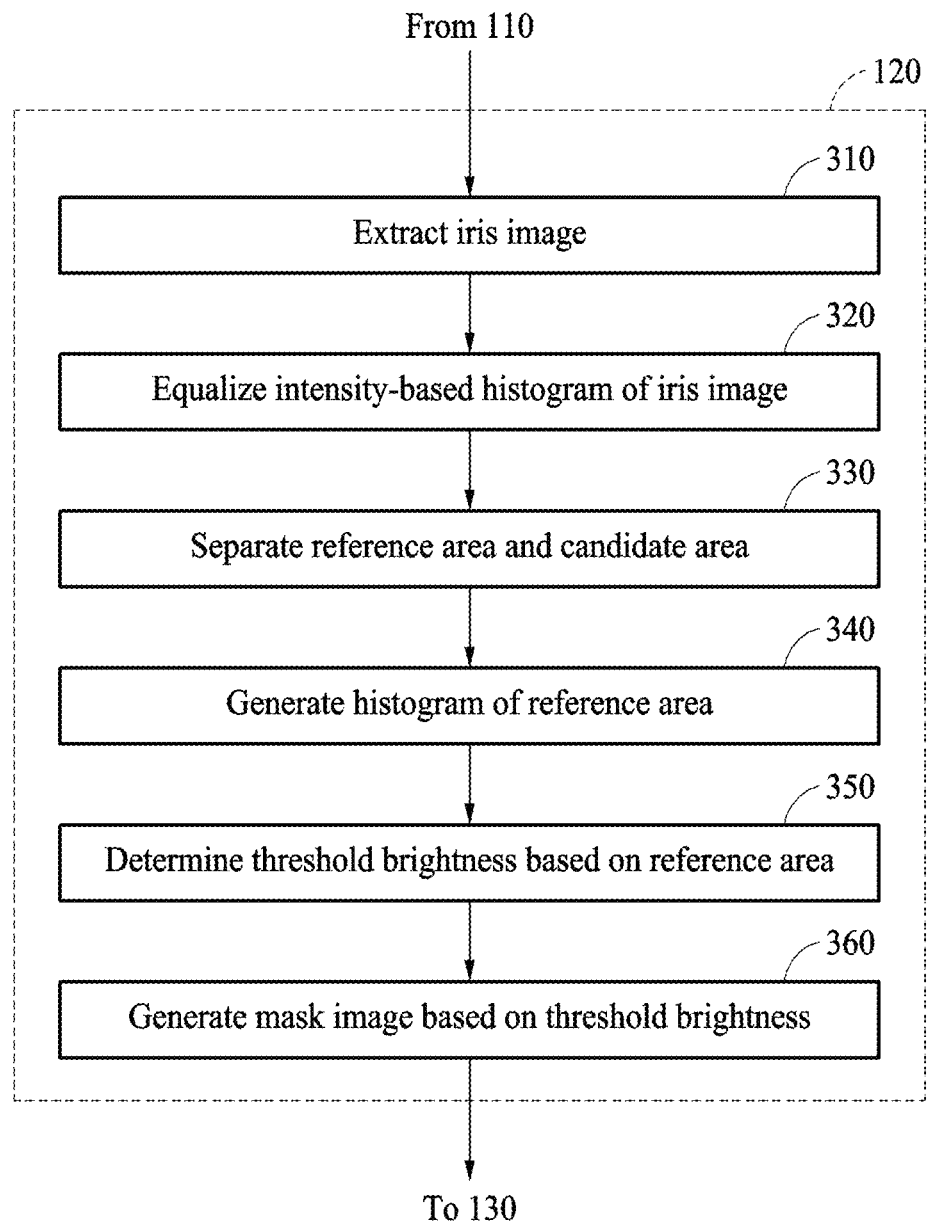
FIG. 3 is a flowchart illustrating a method by which an eyelash mask image is generated according to an exemplary embodiment.

FIG. 3 is a flowchart illustrating an example of a method by which an eyelash mask image is generated.

FIG. 3 illustrates a method of processing an iris image in a circular shape before the iris image is normalized according to an exemplary embodiment.

In operation 310, the iris recognition device extracts an iris image. For example, similar to operation 210 of FIG. 2, the iris recognition device generates the iris image by extracting an iris area from an input image. The iris recognition device may extract the iris area corresponding to an iris or an eye area including an iris, and may apply an equalizing operation to the eye area according to operation 320.

That is, in operation 320, the iris recognition device creates and equalizes an intensity-based histogram of the iris image using the iris image. For example, the iris recognition device may equally spread a distribution of the intensity of the iris image by equalizing an intensity-based histogram. The iris recognition device may enhance a discriminative level with respect to a relatively dark area by extending a gray range of the iris area in grayscale. An eyelash is darker than an iris such that the iris recognition device may obtain an iris image to with the equalization of the intensity-based histogram has been applied in which the discriminative level with respect to the eyelash is enhanced.

In operation 330, the iris recognition device separates a reference area and a candidate area. For example, the iris recognition device separates an upper area, for example, a candidate area, and a lower area, for example, a reference area, based on a y-coordinate value of an iris center position in the iris image in a circular shape before the iris image is normalized. Detailed description of the foregoing is provided with reference to FIG. 6. As another example, the iris recognition device separates a left area, for example, a candidate area, and a right area, for example, a reference area, based on a predetermined x-coordinate value in the iris image in a rectangular shape after the iris image is normalized. Detailed description of the foregoing is provided with reference to FIGS. 11 and 12.

In operation 340, the iris recognition device generates a histogram of the reference area. For example, the histogram indicates a distribution of an intensity value, for example, a brightness value, of a plurality of pixels included in the reference area. Detailed description of the histogram is provided with reference to FIG. 5.

In operation 350, the iris recognition device determines a threshold brightness based on the reference area. For example, the iris recognition device determines, as the threshold brightness, a value obtained by subtracting a weighted standard deviation of the brightness value of each of the pixels from a mean value of the brightness value of each of the pixels included in the reference area. Detailed description of the determining of the threshold brightness is provided with reference to FIG. 7.

A histogram distribution of the iris area may vary depending on illumination differences or different environments when photographing is performed. The iris recognition device may determine the threshold brightness to be a reference for eyelash detection based on a statistical method of the histogram of the reference area such that the threshold brightness is robust against environment changes.

In operation 360, the iris recognition device generates a mask image based on the threshold brightness. The iris recognition device may determine a pixel having a brightness less than the threshold brightness as a target pixel. For example, the iris recognition device detects an area having the brightness less than the threshold brightness as an area corresponding to the eyelash. The iris recognition device may exclude the corresponding area from iris recognition by masking the area corresponding to the eyelash.

Figure 4:
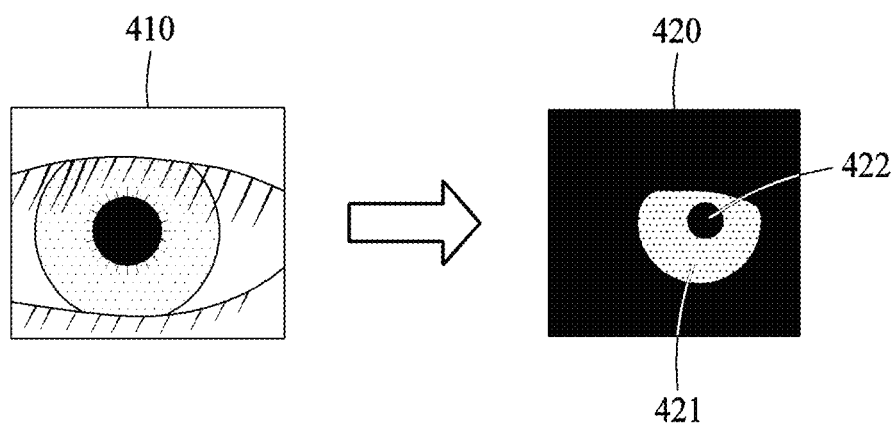
FIG. 4 illustrates extracting an iris area according to an exemplary embodiment.

FIG. 4 illustrates extracting an iris area according to an exemplary embodiment. An iris recognition device calculates area information associated an iris area 421 from an input image 410. The area information includes center positions of a pupil and an iris, radiuses of the pupil and the iris, and eyelid areas. In addition, the area information associated with the iris area 421 may include information on a pupil area 422. The iris recognition device may extract an iris image 420 corresponding to the iris area 421 from the input image 410 based on the area information.

Figure 5:
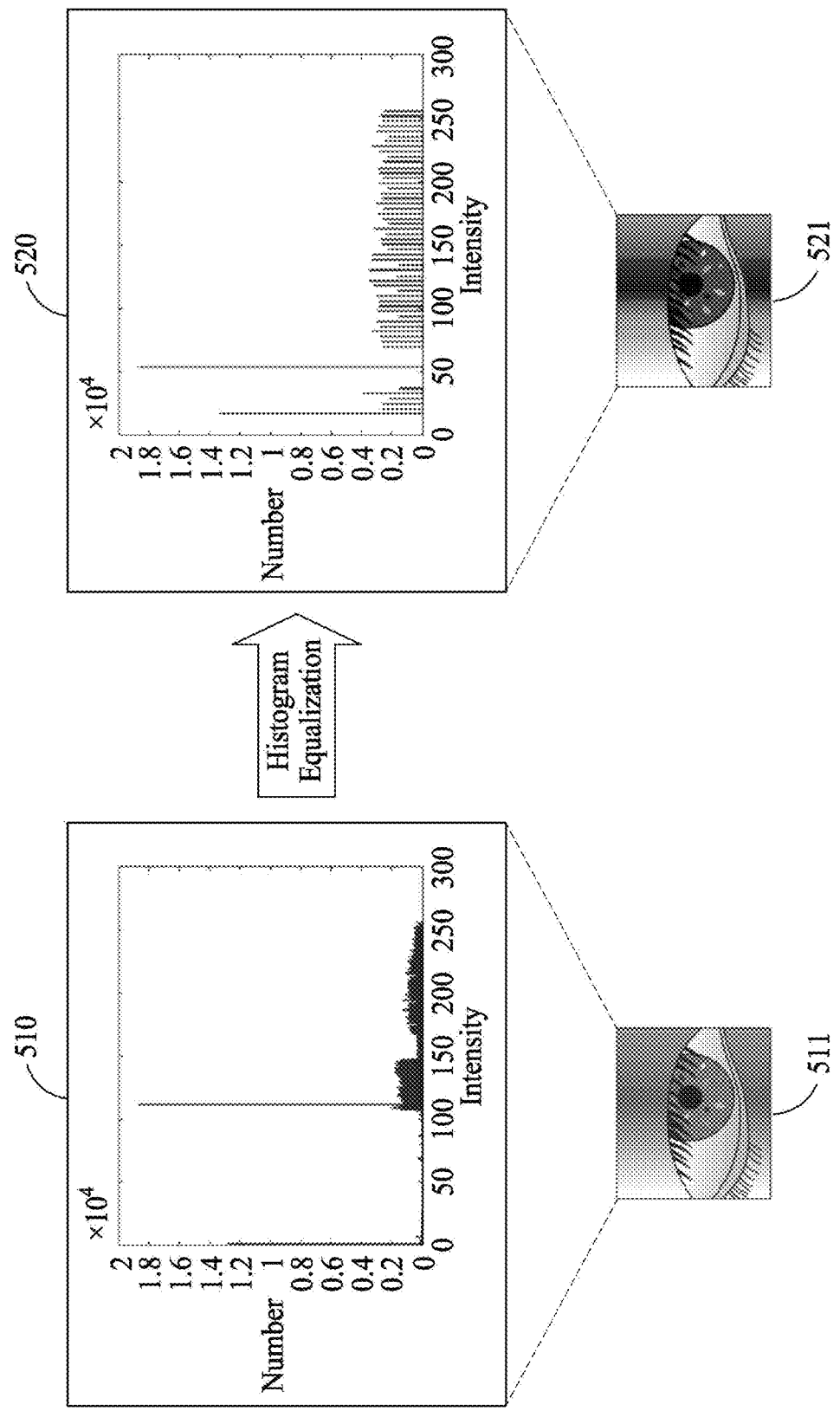
FIG. 5 illustrates equalizing a histogram according to an exemplary embodiment.

FIG. 5 illustrates equalizing a histogram according to an exemplary embodiment.

As an example, an iris recognition device calculates a histogram 510 of an iris area. The iris recognition device may equalize the histogram 510 of the iris area and generate an image 521 having a histogram 520 in which a brightness is equally distributed, as illustrated in FIG. 5. As illustrated in FIG. 5, in comparison to an image 511 generated before equalization is performed, a light and darkness contrast may be emphasized in the image 521 generated after the equalization is performed.

An x-axis of each of the histograms 510 and 520 may indicate an intensity of the iris image. A y-axis of each of the histograms 510 and 520 may indicate a number of pixels having the corresponding intensity.

Figure 6:
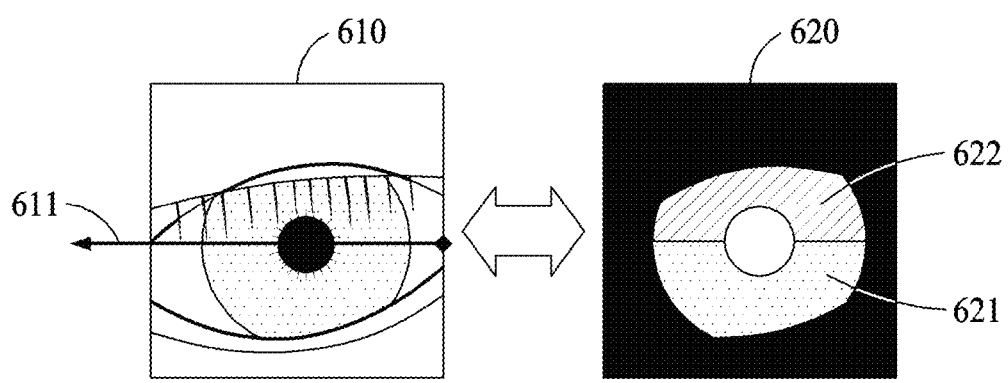
FIG. 6 illustrates extracting a reference area according to an exemplary embodiment.

FIG. 6 illustrates extracting a reference area according to an exemplary embodiment.

An iris recognition device extracts, as a reference area 621, an area in which a target is absent among two areas 621 and 622 divided based on a first axis 611 that crosses a pupil area of an iris image 620. The iris recognition device may determine an axis that horizontally passes through a center point of the pupil area as the first axis 611. The center point of the pupil area may indicate a point identical to the center point or a point neighboring the center point. For example, the iris recognition device determines an upper area of the first axis 611 as the candidate area 622, and determines a lower area of the first axis 611 as the reference area 621 based on y-coordinates of a center position of the iris or a center position of the pupil. FIG. 6 illustrates the first axis 611 on the iris image 610 for ease of description, but the iris recognition device may extract the reference area 621 and the candidate area 622 from the iris image 620 based on the first axis 611. Also, the iris area may be divided such that each of the reference area 621 and the candidate area 622 is half of the iris area based on the first axis 611, but it is not limited thereto. The iris area may be divided in various ways depending on a design. For example, the first axis 611 may be distributed at any angle around the center point, and may be obtuse, acute, or straight.

Referring to FIG. 6, in response to occlusion being severe due to an eyelash in the upper area of the first axis 611 corresponding to the y-coordinates of the center position of the iris, the iris recognition device may determine the upper area of the first axis 611 as the candidate area 622 in which a target pixel is present. In response to occlusion being less severe in the lower area of the first axis 611, the iris recognition device may determine the lower area of the first axis 611 as the reference area 621. A greater number of relatively dark pixels corresponding to the target, for example, an eyelash, may be distributed in the candidate area 622 than in the reference area 621.

Figure 7:
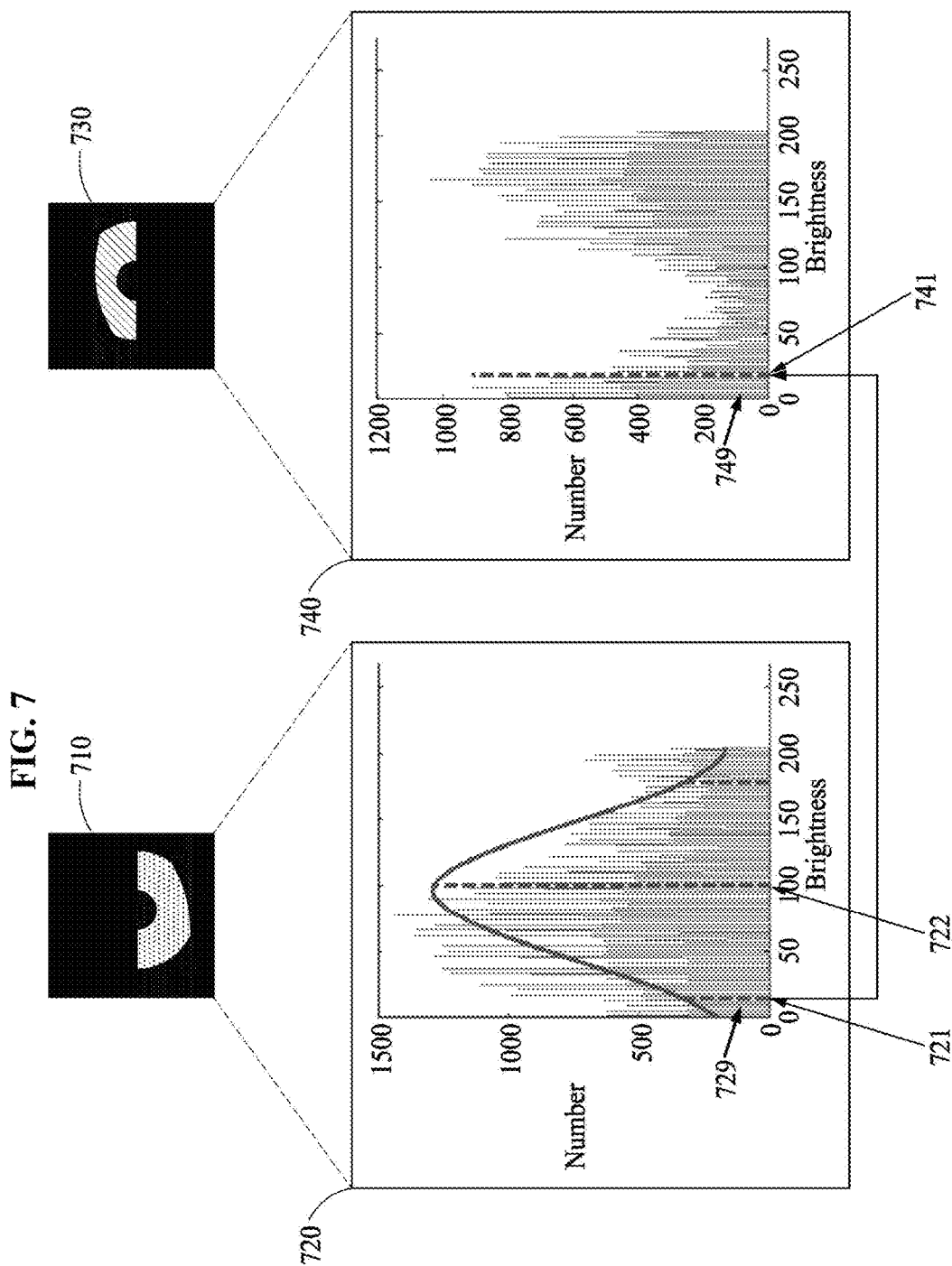
FIG. 7 illustrates applying a threshold brightness to a candidate area based on a histogram of a reference area according to an exemplary embodiment.

FIG. 7 illustrates applying a threshold brightness to a candidate area based on a histogram of a reference area according to an exemplary embodiment.

An iris recognition device calculates a histogram of each of the areas 621 and 622 of FIG. 6. For example, as illustrated in FIG. 7, the iris recognition device calculates a histogram 720 of a reference area $H_{EF}$ 710. Here, the iris recognition device may calculate the histogram 720 of the reference area $H_{EF}$ 710 of an equalized iris image. For example, the iris recognition device determines a pixel of a relatively dark area 729 in the histogram 720 of the reference area $H_{EF}$ 710.

$$\text{Threshold} = \mu - c \times \sigma \quad \quad \quad \text{[Equation 1]}$$

The iris recognition device may calculate a threshold brightness 721 using Equation 1. In Equation 1, µ denotes a mean value 722 of the histogram 720 of the reference area $H_{EF}$ 710. Here, σ denotes a standard deviation of the histogram 720 of the reference area $H_{EF}$ 710. Also, c is a constant and denotes a weight of the standard deviation. The weight c may be determined based on an experiment and a simulation. In the present disclosure, c×σ indicates the weighted standard deviation.

The iris recognition device determines a plurality of pixels having a brightness less than a threshold brightness 741 as target pixels from the pixels included in a candidate area $H_{EC}$ 730. For example, the iris recognition device determines the threshold brightness 741 to be a value identical to the threshold brightness 721 determined based on the histogram 720 of the reference area $H_{EF}$ 710. Thus, as illustrated in FIG. 7, the iris recognition device may exclude pixels corresponding to an area 749 of which the brightness is less than the threshold brightness 741 from a histogram 740 of the candidate area $H_{EC}$ 730. FIG. 7 illustrates the histogram 740 of the candidate area $H_{EC}$ 30 for ease of description, but the iris recognition device may determine the threshold brightness 721 and the threshold brightness 741 only using the histogram 720 of the reference area $H_{EF}$ 710 without calculating the histogram 740 of the candidate area $H_{EC}$ 730.

Figure 8:
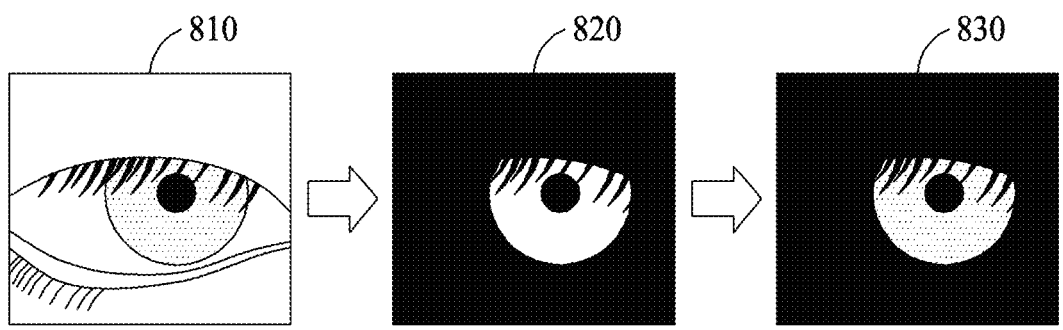
FIG. 8 illustrates generating a mask image according to an exemplary embodiment.

FIG. 8 illustrates generating a mask image according to an exemplary embodiment.

An iris recognition device may generate a mask image of an input image 810. For example, the iris recognition device generates a mask image 820 corresponding to a target pixel. The iris recognition device may exclude the target pixel from an iris area based on a mask image. The iris recognition device may exclude pixels having a brightness less than a threshold brightness from iris recognition. As illustrated in FIG. 8, eyelashes may be removed from an iris image 830 to which the mask image is applied.

Figure 9:
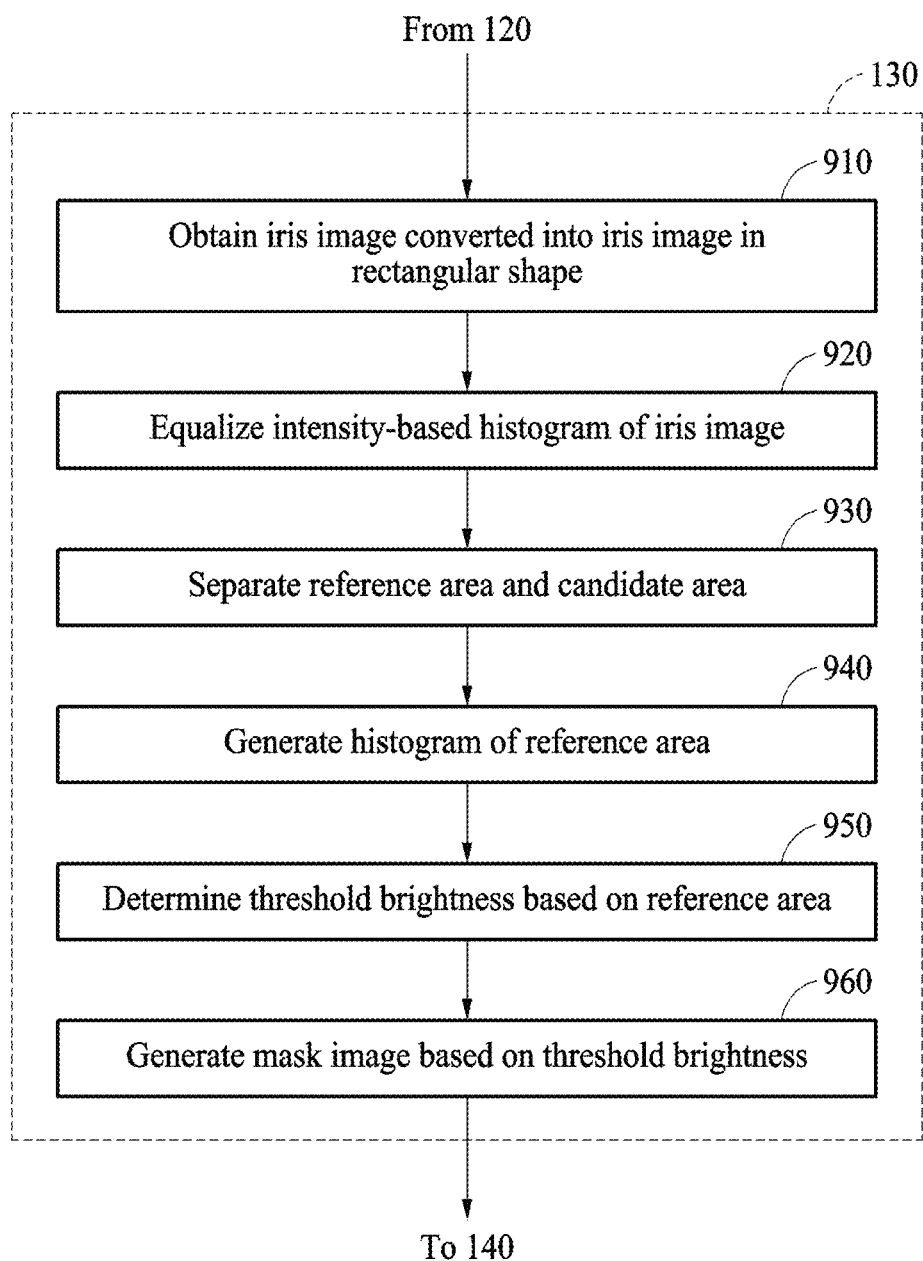
FIG. 9 is a flowchart illustrating a method by which an eyelash mask image is generated based on a normalized iris image according to an exemplary embodiment.

FIG. 9 is a flowchart illustrating a method by which an eyelash mask image is generated based on a normalized iris image according to an exemplary embodiment. That is, FIG. 9 illustrates an example of a method of processing an iris image in a rectangular shape. An iris recognition device may perform an operation similar to an operation of FIG. 3 on an iris image in a rectangular shape.

Figure 10:
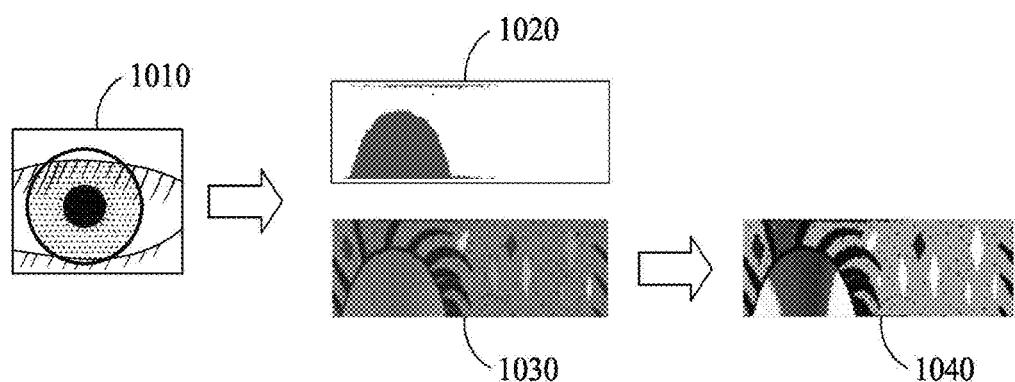
FIG. 10 illustrates equalizing a histogram of a normalized iris image according to an exemplary embodiment.

In operation 910, the iris recognition device obtains an iris image converted into an iris image in a rectangular shape. For example, the iris recognition device has spread a circular iris image into a rectangular shape. For example, the iris image in the rectangular shape is as illustrated in FIG. 10.

In operation 920, the iris recognition device equalizes an intensity-based histogram of the iris image. For example, the iris recognition device adjusts brightness values of a plurality of pixels included in the iris image such that a brightness is equally distributed in the intensity-based histogram of the iris image in the rectangular shape.

In operation 930, the iris recognition device separates a reference area and a candidate area. The iris recognition device may set a second axis, for example, a vertical axis, that divides the iris image in the rectangular shape. The iris recognition device may determine one area as the reference area and the other area as the candidate area based on the vertical axis. As described above with reference to FIG. 6, the second axis may not be a vertical axis, and may be another axis, including, for example, an obtuse, acute, or straight angle about the center of the iris.

In operation 940, the iris recognition device generates a histogram of the reference area. The histogram of the reference area may be calculated by a method similar to that of FIG. 7.

In operation 950, the iris recognition device determines a threshold brightness based on the reference area. The iris recognition device may determine the threshold brightness based on the calculated histogram of the reference area.

In operation 960, the iris recognition device generates a mask image based on the threshold brightness. The iris recognition device may generate the mask image including target pixels having a brightness less than the threshold brightness.

FIG. 10 illustrates equalizing a histogram of a normalized iris image according to an exemplary embodiment.

An iris recognition device may extract an iris area in a circular shape from an input image 1010, and may generate an iris image 1030 in a rectangular shape by converting the iris area in the circular shape. The iris recognition device may generate a mask image 1020 in a rectangular shape corresponding to the iris image 1030 in the rectangular shape. The mask image 1020 in the rectangular shape may include an exclusion area. The exclusion area may be an area other than an iris area, or may be an area occluded by eyelashes or other non-iris features. For example, the exclusion area may be an area corresponding to eyelashes. The iris recognition device may generate an image 1040 obtained by equalizing the iris image 1030 in the rectangular shape.

Figure 11:
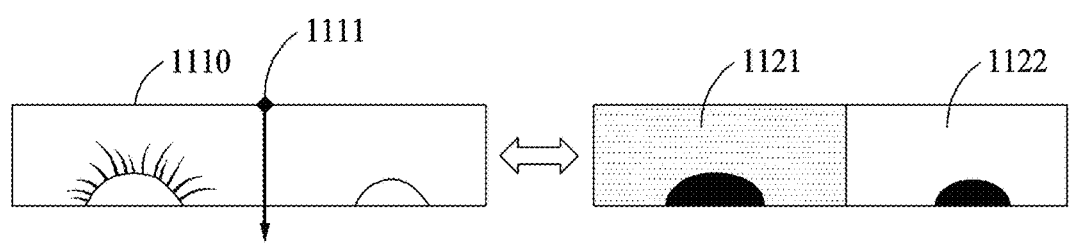
FIGS. 11 and 12 each illustrate extracting a reference area from a normalized iris image according to an exemplary embodiment.
Figure 12:
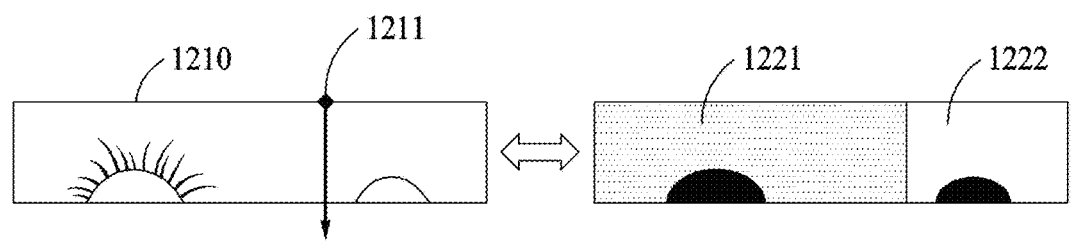

FIGS. 11 and 12 each illustrate extracting a reference area from a normalized iris image according to an exemplary embodiment.

An iris recognition device may obtain iris images 1110 and 1210 normalized by converting an input image including an iris image. The iris recognition device may divide each of the iris images 1110 and 1210 into two areas based on second axes 1111 and 1211 that do not pass through targets in the iris images 1110 and 1210, respectively. For example, the second axes 1111 and 1211 that do not pass through the targets indicate that the second axes 1111 and 1211 do not overlap eyelashes. The iris recognition device may extract areas in which the targets are absent as reference areas 1122 and 1222. The second axes 1111 and 1211 may pass through two exclusion areas included in the iris images 1110 and 1210 in rectangular shapes. The second axes 1111 and 1211 may be vertical axes as illustrated in FIGS. 11 and 12. The second axes 1111 and 1211 may be changed, as described above. For example, the second axis 1111 is an axis that vertically penetrates a center of the iris image 1110 in the rectangular shape as illustrated in FIG. 11, and the second axis 1211 is an axis that penetrates a right portion of a center of the iris image 1210 as illustrated in FIG. 12. A candidate area 1121 divided based on the second axis 1111 of FIG. 11 may be a 180-degree area of the iris image 1110 in a circular shape having a 360-degree area. A candidate area 1221 divided based on the second axis 1211 of FIG. 12 may be, for example, a 210-degree area of a candidate image in a circular shape having a 360-degree area.

Also, the iris recognition device may determine a first axis and a second axis based on an ethnicity, a size of an eye, an area of an iris, lengths of eyelashes of a user, etc. For example, the iris recognition device determines a first axis and a second axis such that sizes of the candidate areas 1121 and 1221 are increased more than sizes of the reference areas 1122 and 1222 as sizes of eyelash areas are increased.

Figure 13:
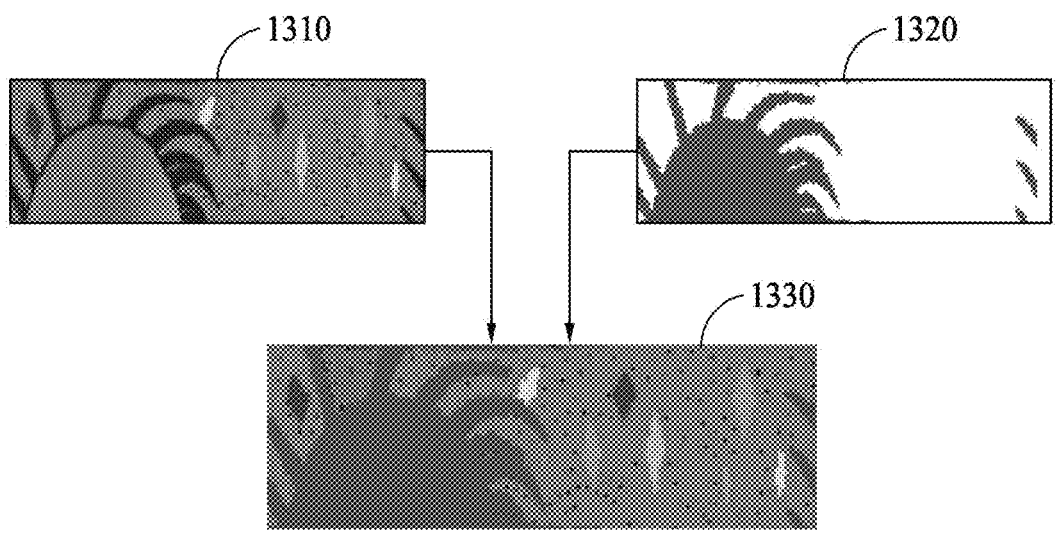
FIG. 13 illustrates generating a mask image based on a normalized iris image according to an exemplary embodiment.

FIG. 13 illustrates generating a mask image based on a normalized iris image in an exemplary embodiment.

An iris recognition device may generate an iris mask image 1320 including an exclusion area, for example, an area corresponding to an eyelash, and a target pixel, for example, a pixel corresponding to an eyelash. The iris recognition device may generate an iris image 1330 from which the target pixel is excluded by applying the iris mask image 1320 to an iris image 1310.

The iris recognition device may perform iris recognition using the iris image 1330 from which the target pixel is excluded.

Figure 14:
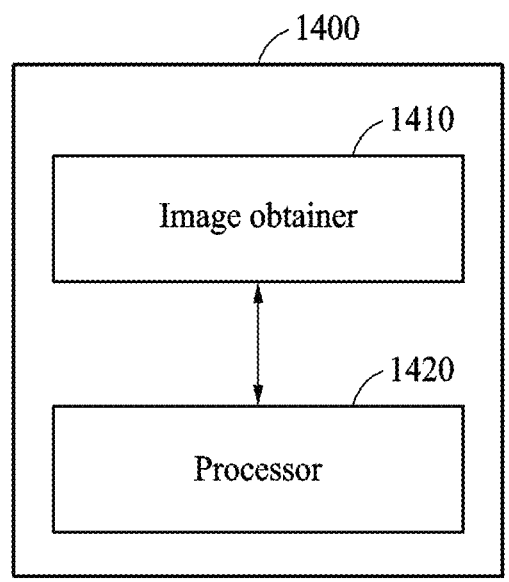
FIG. 14 is a block diagram illustrating an iris recognition device according to an exemplary embodiment.

FIG. 14 is a block diagram illustrating an iris recognition device according to an exemplary embodiment.

An iris recognition device 1400 includes an image obtainer 1410 and a processor 1420.

The image obtainer 1410 obtains an iris image. For example, the image obtainer 1410 may include an iris sensor.

The processor 1420 extracts a reference area from the iris image, determines a threshold brightness based on a plurality of pixels included in the reference area, and determines a target pixel to be excluded from iris recognition in the iris image based on the threshold brightness. However, an operation of the processor 1420 is not limited thereto. The processor 1420 may perform the above-described operations of FIGS. 1 through 13.

The iris recognition device 1400 may be used in various fields and various devices, for example, a smartphone and a television (TV). For example, the iris recognition device 1400 performs iris-based user authentication and registration in a smartphone and a mobile device, performs iris-based payment and banking in a smartphone and a mobile device, and performs user authentication in a smart home including a smart door and a smart TV.

The iris recognition device 1400 may have a recognition performance robust against eyelashes that are variably photographed. The iris recognition device 1400 may exclude the eyelashes from iris recognition in the iris image based on a relatively small number of operations and a relatively small amount of memory.

Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of recognizing an iris, the method comprising:
   obtaining an iris image from an input image;
   extracting a reference area from the obtained iris image;
   extracting, dependent on a severity of eyelash occlusion, a candidate area from the obtained iris image;
   determining a threshold brightness based on a plurality of pixels included in the extracted reference area; and
   determining a target pixel, in the candidate area, to be excluded from iris recognition based on the determined threshold brightness.

2. The method of claim 1, wherein the extracting of the reference area comprises:
   normalizing the obtained iris image; and
   extracting the reference area from the normalized iris image.

3. The method of claim 1, wherein the extracting of the reference area comprises extracting, as the reference area, an area in which a target is absent among two areas divided based on an axis that crosses a pupil area of the iris image.

4. The method of claim 3, wherein the axis horizontally passes through a center point of the pupil area.

5. The method of claim 1, wherein the iris image is normalized by converting the input image, and the extracting of the reference area comprises dividing the iris image into two areas based on an axis that does not pass through a target in the iris image, and extracting, as the reference area, an area in which the target is absent among the two areas.

6. The method of claim 1, wherein the determining of the threshold brightness comprises:
   generating a histogram associated with the plurality of pixels included in the extracted reference area; and
   determining the threshold brightness based on the histogram.

7. The method of claim 1, further comprising equalizing an intensity-based histogram of the iris image.

8. The method of claim 1, wherein the candidate area does not overlap the reference area.

9. The method of claim 1, further comprising:
   extracting an iris feature from pixel information from the iris image, excluding the target pixel; and
   recognizing a user based on the extracted iris feature.

10. A non-transitory computer-readable medium storing instructions that, when executed by a processor, cause the processor to perform the method of claim 1.

11. The method of claim 1, wherein the determining of the threshold brightness comprises determining, as the threshold brightness, a value obtained by subtracting a weighted standard deviation of a brightness value of each of the pixels from a mean value of the brightness value of each of the pixels included in the reference area.

12. The method of claim 1, wherein the candidate areas is determined to have more severe eyelash occlusion than the reference area.

13. The method of claim 1, further comprising:
   determining an axis that horizontally passes through a center point of a pupil area of the iris image;
   determining a first area bordering the axis as the candidate area, and
   determining a second area bordering the axis as the reference area.

14. The method of claim 13, wherein the first area is closer to an eyelash area than the second area.

15. A method of recognizing an iris, the method comprising:
   obtaining an iris image;
   extracting a reference area from the iris image;
   extracting, dependent on a severity of eyelash occlusion, a candidate area from the obtained iris image;
   determining a threshold brightness based on a plurality of pixels included in the reference area; and
   determining a target pixel, in the candidate area, to be excluded from iris recognition based on the threshold brightness,
   wherein the extracting of the reference area and the extracting of the candidate area comprise:
   dividing the iris image into a plurality of areas; and
   extracting one of the plurality of areas as the reference area and another of the plurality of areas as the candidate area.

16. A method of recognizing an iris, the method comprising:
   obtaining an iris image;
   extracting a reference area from the iris image;
   determining a threshold brightness based on a plurality of pixels included in the reference area; and
   determining a target pixel to be excluded from iris recognition in the iris image based on the threshold brightness,
   wherein the determining of the threshold brightness comprises determining, as the threshold brightness, a value obtained by subtracting a weighted standard deviation of a brightness value of each of the pixels from a mean value of the brightness value of each of the pixels included in the reference area.

17. An iris recognition device, comprising:
a camera configured to capture an input image; and
a processor configured to
   obtain an iris image from the input image,
   extract a reference area from the obtained iris image,
   extract, dependent on a severity of eyelash occlusion, a candidate area from the obtained iris image,
   determine a threshold brightness based on a plurality of pixels included in the extracted reference area, and
   determine a target pixel, in the candidate area, to be excluded from iris recognition based on the determined threshold brightness.

18. The iris recognition device of claim 17, wherein the processor is further configured to divide the iris image into a plurality of areas, and extract one of the areas as the reference area.

19. The iris recognition device of claim 17, wherein the processor is further configured to normalize the obtained iris image, and extract the reference area from the normalized iris image.

20. The iris recognition device of claim 17, wherein the processor is further configured to extract, as the reference area, an area in which a target is absent among two areas divided based on a first axis that crosses a pupil area of the iris image.

21. The iris recognition device of claim 17, wherein the processor is further configured to convert the input image to obtain the iris image that is normalized, divide the iris image into two areas based on a second axis that does not pass through a target in the iris image, and extract, as the reference area, an area in which the target is absent among the two areas.

22. The iris recognition device of claim 17, wherein the processor is further configured to generate a histogram associated with the plurality of pixels included in the extracted reference area, and determine the threshold brightness based on the histogram.

23. The iris recognition device of claim 17, wherein the processor is further configured to determine, as the threshold brightness, a value obtained by subtracting a weighted standard deviation of a brightness value of each of the plurality of pixels from a mean value of the brightness value of each of the plurality of pixels included in the extracted reference area.

24. The iris recognition device of claim 17, wherein the candidate area does not overlap the reference area.

* * * * *